US011937642B2

(12) United States Patent
Mironov et al.

(10) Patent No.: US 11,937,642 B2
(45) Date of Patent: Mar. 26, 2024

(54) AEROSOL-GENERATING ARTICLE WITH MULTI-MATERIAL SUSCEPTOR

(71) Applicant: Philip Morris Products S.A., Neuchatel (CH)

(72) Inventors: Oleg Mironov, Neuchatel (CH); Ihar Nikolaevich Zinovik, Peseux (CH); Oleg Fursa, Lignieres (CH)

(73) Assignee: Philip Morris Products S.A., Neuchatel (CH)

( * ) Notice: Subject to any disclaimer, the term of this patent is extended or adjusted under 35 U.S.C. 154(b) by 478 days.

(21) Appl. No.: 17/158,225

(22) Filed: Jan. 26, 2021

(65) Prior Publication Data

US 2021/0145059 A1 May 20, 2021

Related U.S. Application Data

(63) Continuation of application No. 16/037,126, filed on Jul. 17, 2018, now Pat. No. 10,945,466, which is a
(Continued)

(30) Foreign Application Priority Data

May 21, 2014 (EP) .................................... 14169192
May 21, 2014 (EP) .................................... 14169194
May 21, 2014 (EP) .................................... 14169241

(51) Int. Cl.
*H05B 6/06* (2006.01)
*A24D 1/20* (2020.01)
(Continued)

(52) U.S. Cl.
CPC .............. *A24F 40/465* (2020.01); *A24D 1/20* (2020.01); *A24F 40/46* (2020.01); *A24F 40/50* (2020.01);
(Continued)

(58) Field of Classification Search
CPC ... B05C 17/00; B05C 5/04; B05C 7/24; A24F 40/465; A24F 40/46; A24F 40/50;
(Continued)

(56) References Cited

U.S. PATENT DOCUMENTS 4,256,945 A 3/1981 Carter et al.
4,566,804 A 1/1986 Collins
(Continued)

FOREIGN PATENT DOCUMENTS

CA 1 147 381 A 5/1983
CN 1126426 * 7/1996
(Continued)

OTHER PUBLICATIONS

International Search Report and Written Opinion of the International Searching Authority dated Sep. 10, 2015 in PCT/EP15/061293 Filed May 21, 2015.
(Continued)

*Primary Examiner* — Nathaniel E Wiehe
*Assistant Examiner* — Frederick F Calvetti
(74) *Attorney, Agent, or Firm* — Oblon, McClelland, Maier & Neustadt, L.L.P.

(57) ABSTRACT

An aerosol-generating article is provided, including: a plurality of elements assembled within a wrapper in the form of a rod having a mouth end and a distal end upstream from the mouth end, the plurality of elements including an aerosol-forming substrate disposed at or towards the distal end of the rod; and a susceptor configured to heat the aerosol-forming substrate, the susceptor including a first susceptor material and a second susceptor material being different from the first susceptor material, the second susceptor material being plated, deposited, or welded onto the first susceptor material, the susceptor being an elongate susceptor having a length dimension that is greater than a width dimension thereof or
(Continued)

than a thickness dimension thereof, the susceptor being disposed in a radially central position within the aerosol-forming substrate, and the second susceptor material having a Curie temperature that is lower than 500° C.

16 Claims, 4 Drawing Sheets

Related U.S. Application Data continuation of application No. 14/897,732, filed as application No. PCT/EP2015/061293 on May 21, 2015, now Pat. No. 10,051,890.

(51) Int. Cl.
*A24F 40/46* (2020.01)
*A24F 40/465* (2020.01)
*A24F 40/50* (2020.01)
*H05B 6/10* (2006.01)
*A24F 40/20* (2020.01)

(52) U.S. Cl.
CPC ............... *H05B 6/06* (2013.01); *H05B 6/105* (2013.01); *A24F 40/20* (2020.01); *H05B 2206/023* (2013.01)

(58) Field of Classification Search
CPC . A24D 1/20; H05B 6/105; H05B 6/06; H05B 2206/023
USPC .......................................................... 219/634
See application file for complete search history.

(56) References Cited

U.S. PATENT DOCUMENTS

| | | | | |
|---|---|---|---|---|
| 4,789,767 | A | 12/1988 | Doljack | |
| 5,060,671 | A | 10/1991 | Counts | |
| 5,093,894 | A | 3/1992 | Deevi | |
| 5,128,504 | A | 7/1992 | Mcgaffigan | |
| 5,144,162 | A | 9/1992 | Tran | |
| 5,144,962 | A | 9/1992 | Counts | |
| 5,269,327 | A * | 12/1993 | Counts | A24F 40/30 131/194 |
| 5,368,199 | A | 11/1994 | Haas | |
| 5,391,864 | A | 2/1995 | Bodor | |
| 5,529,708 | A | 6/1996 | Palmgren | |
| 5,613,505 | A * | 3/1997 | Campbell | A24F 40/53 131/194 |
| 5,649,554 | A * | 7/1997 | Sprinkel | A24F 40/465 131/194 |
| 5,665,262 | A * | 9/1997 | Hajaligol | A24F 40/46 131/194 |
| 5,911,898 | A * | 6/1999 | Jacobs | H05B 6/106 219/486 |
| 6,501,059 | B1 | 12/2002 | Mast | |
| 6,681,998 | B2 | 1/2004 | Sharpe | |
| 6,747,253 | B1 | 6/2004 | Firth | |
| 7,212,087 | B2 | 5/2007 | Nagai | |
| 7,323,666 | B2 | 1/2008 | Spohn | |
| 7,745,355 | B2 * | 6/2010 | Spohn | B32B 25/20 219/653 |
| 8,915,255 | B2 | 12/2014 | Poget | |
| 9,408,416 | B2 | 8/2016 | Monsees | |
| 9,713,345 | B2 | 7/2017 | Farine | |
| 9,820,512 | B2 * | 11/2017 | Mironov | A24F 40/465 |
| 9,877,359 | B2 | 1/2018 | Duffield | |
| 9,924,566 | B2 * | 3/2018 | Duffield | A61L 9/03 |
| 9,949,507 | B2 | 4/2018 | Flick | |
| 10,028,535 | B2 * | 7/2018 | Mironov | H05B 1/0244 |
| 10,051,890 | B2 * | 8/2018 | Mironov | A24F 40/465 |
| 10,071,179 | B2 | 9/2018 | Duffield | |
| 10,130,121 | B2 | 11/2018 | Plojoux | |
| 10,159,283 | B2 * | 12/2018 | Mironov | H05B 6/106 |
| 10,293,069 | B2 | 5/2019 | Duffield | |
| 10,327,473 | B2 * | 6/2019 | Mironov | A24B 3/14 |
| 10,350,321 | B2 | 7/2019 | Duffield | |
| 10,375,994 | B2 * | 8/2019 | Mironov | H05B 6/38 |
| 10,463,080 | B2 * | 11/2019 | Mironov | H05B 6/108 |
| 10,477,894 | B2 * | 11/2019 | Mironov | H05B 6/36 |
| 10,531,690 | B2 | 1/2020 | Dooly | |
| 10,537,135 | B2 | 1/2020 | Smith | |
| 10,945,466 | B2 * | 3/2021 | Mironov | A24D 1/20 |
| 10,952,469 | B2 * | 3/2021 | Mironov | A24F 40/465 |
| 2002/0113066 | A1 | 8/2002 | Stark | |
| 2005/0172976 | A1 | 8/2005 | Newman et al. | |
| 2007/0235046 | A1 * | 10/2007 | Gedevanishvili | A24D 3/046 131/201 |
| 2008/0006796 | A1 * | 1/2008 | Khatua | C09C 1/36 252/500 |
| 2008/0122367 | A1 | 5/2008 | Vinogradov | |
| 2009/0246332 | A1 | 10/2009 | Lai | |
| 2010/0264135 | A1 | 10/2010 | Cole | |
| 2011/0290269 | A1 | 12/2011 | Shimizu | |
| 2014/0305448 | A1 | 10/2014 | Zuber | |
| 2015/0060437 | A1 * | 3/2015 | Karch | H05B 6/105 219/634 |
| 2015/0223292 | A1 * | 8/2015 | Duffield | A61L 9/037 219/634 |
| 2015/0250028 | A1 | 9/2015 | Duffield | |
| 2015/0272219 | A1 | 10/2015 | Hatrick | |
| 2015/0320113 | A1 | 11/2015 | Stebbins | |
| 2016/0157302 | A1 | 6/2016 | Matsen | |
| 2016/0295921 | A1 | 10/2016 | Mironov | |
| 2018/0124994 | A1 | 5/2018 | Kaeb | |
| 2018/0206295 | A1 | 7/2018 | Duffield | |
| 2020/0037667 | A1 | 2/2020 | Woodcock | |

FOREIGN PATENT DOCUMENTS

| | | | | |
|---|---|---|---|---|
| CN | 101390659 | A | | 3/2009 |
| CN | 201683029 | U | | 12/2010 |
| EP | 2 444 112 | | | 4/2012 |
| EP | 2 609 821 | A1 | | 7/2013 |
| EP | 2762020 | | * | 8/2014 |
| ES | 2688374 | | * | 11/2015 |
| JP | 58-501062 | | | 6/1983 |
| JP | 7-506295 | | | 7/1995 |
| JP | 8-511175 | | | 11/1996 |
| JP | 2972340 | B2 | | 11/1999 |
| JP | 2004 529724 | A | | 9/2004 |
| JP | 2005 501572 | A | | 1/2005 |
| JP | 2005 503846 | A | | 2/2005 |
| JP | 2005-516357 | A | | 6/2005 |
| JP | 2014-530632 | | | 11/2014 |
| KR | 1020210097796 | | * | 9/2021 |
| RU | 107 026 | U1 | | 8/2011 |
| WO | 1994/006314 | | | 3/1994 |
| WO | 94/19917 | A1 | | 9/1994 |
| WO | 95 27411 | | | 10/1995 |
| WO | WO95/27411 | | * | 10/1995 |
| WO | 2013/060781 | | | 5/2013 |
| WO | WO2013/060781 | | * | 5/2013 |
| WO | 2013/102614 | | | 7/2013 |
| WO | WO2013/098411 | | * | 7/2013 |
| WO | 2014/048745 | A1 | | 4/2014 |
| WO | WO2014/048745 | | * | 4/2014 |
| WO | WO2015177046 | | * | 11/2015 |

OTHER PUBLICATIONS

Office Action dated Apr. 8, 2016 in Korean Patent Application No. 10-2015-7034484 (submitting English translation only).

Combined Office Action and Search Report dated Jul. 10, 2017 in Chinese Patent Application No. 2015800006532 (submitting English language translation only).

Decision to Grant dated Dec. 21, 2017 in Russian Patent Application No. 2015146662 (submitting English language translation only).

(56) References Cited

OTHER PUBLICATIONS

Japanese Office Action, English translation only, dated Aug. 8, 2016 in corresponding Japanese Patent Application No. 2015-563102, 6 pages.
Notice of Allowance, with English translation, dated Sep. 27, 2016, received in the corresponding South Korean application No. 10-2015-7034484, citing document BR therein, 4 pages.
PCT Search Report and Written Opinion for PCT/EP2015/061217 dated Sep. 10, 2015 (9 pages).
PCT Search Report and Written Opinion for PCT/EP2015/061218 dated Sep. 8, 2015 (9 pages).
PCT Search Report and Written Opinion for PCT/EP2015/061219 dated Sep. 8, 2015 (8 pages).
Decision of Grant dated Dec. 12, 2016 in corresponding Japanese Patent Application No. 2015-5615102, 3 pages.
Combined Taiwanese Office Action and Search Report dated Sep. 26, 2018 in Taiwanese Patent Application No. 104116217 (submitting English translation only), 6 pages.
Indian Office Action dated Jan. 21, 2020, in Patent Application No. 201617028283, 5 pages.
Ukrainian Notice of Allowance dated Apr. 6, 2020 in Ukrainian Patent Application No. A201610894 (with English translation), 14 pages.
English language machine translation of CN 1126426, Jul. 10, 1996 (machine translation obtained May 22, 2020), 19 pages.

* cited by examiner

AEROSOL-GENERATING ARTICLE WITH MULTI-MATERIAL SUSCEPTOR

CROSS-REFERENCE TO RELATED APPLICATIONS

This application is a continuation application of and claims the benefit of priority under 35 U.S.C. § 120 from U.S. application Ser. No. 16/037,126, filed on Jul. 17, 2018, which is a continuation of U.S. application Ser. No. 14/897,732, filed on Dec. 11, 2015 (now U.S. Pat. No. 10,051,890), which is a U.S. National Stage application of PCT/EP2015/061293, filed on May 21, 2015, and claims benefit of priority under 35 U.S.C. § 119 from EP 14169192.3, filed on May 21, 2014, from EP 14169194.09, filed on May 21, 2014, and from EP 14169241.8, filed on May 21, 2014, the entire contents of each of which are incorporated herein by reference.

The present specification relates to an aerosol-generating article comprising an aerosol-forming substrate for generating an inhalable aerosol when heated. The aerosol-generating article comprises a susceptor for heating the aerosol-forming substrate, such that heating of the aerosol-forming substrate may be effected in a contactless manner by induction-heating. The susceptor comprises at least two different materials having differing Curie temperatures. The specification also relates to a system comprising such an aerosol-generating article and an aerosol-generating device having an inductor for heating the aerosol-generating device.

A number of aerosol-generating articles, or smoking articles, in which tobacco is heated rather than combusted have been proposed in the art. One aim of such heated aerosol-generating articles is to reduce known harmful smoke constituents of the type produced by the combustion and pyrolytic degradation of tobacco in conventional cigarettes.

Typically in such heated aerosol-generating articles, an aerosol is generated by the transfer of heat from a heat source to a physically separate aerosol-forming substrate or material. During smoking, volatile compounds are released from the aerosol-forming substrate by heat transfer from the heat source and entrained in air drawn through the aerosol-generating article. As the released compounds cool, they condense to form an aerosol that is inhaled by the user.

A number of prior art documents disclose aerosol-generating devices for consuming or smoking heated aerosol-generating articles. Such devices include, for example, electrically heated aerosol-generating devices in which an aerosol is generated by the transfer of heat from one or more electrical heating elements of the aerosol-generating device to the aerosol-forming substrate of a heated aerosol-generating article. One advantage of such electrical smoking systems is that they significantly reduce sidestream smoke, while permitting a user to selectively suspend and reinitiate smoking.

An example of an aerosol-generating article, in the form of an electrically heated cigarette, for use in electrically operated aerosol-generating system is disclosed in US 2005/0172976 A1. The aerosol-generating article is constructed to be inserted into a cigarette receiver of an aerosol-generating device of the aerosol-generating system. The aerosol-generating device includes a power source that supplies energy to a heater fixture including a plurality of electrically resistive heating elements, which are arranged to slidingly receive the aerosol-generating article such that the heating elements are positioned alongside the aerosol-generating article.

The system disclosed in US 2005/0172976 A1 utilizes an aerosol-generating device comprising a plurality of external heating elements. Aerosol-generating devices with internal heating elements are also known. In use, the internal heating elements of such aerosol-generating devices are inserted into the aerosol-forming substrate of a heated aerosol-generating article such that the internal heating elements are in direct contact with the aerosol-forming substrate.

Direct contact between an internal heating element of an aerosol-generating device and the aerosol-forming substrate of an aerosol-generating article can provide an efficient means for heating the aerosol-forming substrate to form an inhalable aerosol. In such a configuration, heat from the internal heating element may be conveyed almost instantaneously to at least a portion of the aerosol-forming substrate when the internal heating element is actuated, and this may facilitate the rapid generation of an aerosol. Furthermore, the overall heating energy required to generate an aerosol may be lower than would be the case in an aerosol-generating system comprising an external heater element where the aerosol-forming substrate does not directly contact the external heating element and initial heating of the aerosol-forming substrate occurs primarily by convection or radiation. Where an internal heating element of an aerosol-generating device is in direct contact with an aerosol-forming substrate, initial heating of portions of the aerosol-forming substrate that are in direct contact with the internal heating element will be effected primarily by conduction.

A system involving an aerosol-generating device having an internal heating element is disclosed in WO2013102614. In this system a heating element is brought into contact with an aerosol-forming substrate, the heating element undergoes a thermal cycle during which it is heated and then cooled. During contact between the heating element and the aerosol-forming substrate, particles of the aerosol-forming substrate may adhere to a surface of the heating element. Furthermore, volatile compounds and aerosol evolved by the heat from the heating element may become deposited on a surface of the heating element. Particles and compounds adhered to and deposited on the heating element may prevent the heating element from functioning in an optimal manner. These particles and compounds may also break down during use of the aerosol-generating device and impart unpleasant or bitter flavours to a user. For these reasons it is desirable to clean the heating element periodically. A cleaning process may involve use of a cleaning tool such as a brush. If cleaning is carried out inappropriately, the heating element may become damaged or broken. Furthermore, inappropriate or careless insertion and removal of an aerosol-generating article into the aerosol-generating device may also damage or break the heating element.

Prior art aerosol-delivery systems are known, which comprise an aerosol-forming substrate and an inductive heating device. The inductive heating device comprises an induction source, which produces an alternating electromagnetic field that induces a heat generating eddy current in a susceptor material. The susceptor material is in thermal proximity of the aerosol-forming substrate. The heated susceptor material in turn heats the aerosol-forming substrate which comprises a material which is capable of releasing volatile compounds that can form an aerosol. A number of embodiments for aerosol-forming substrates have been described in the art which are provided with diverse configurations for the susceptor material in order to ascertain an adequate heating of the aerosol-forming substrate. Thus, an operating temperature of the aerosol-forming substrate is strived for at which the release of volatile compounds that can form an aerosol is satisfactory. It would be desirable to be able to control the operating temperature of the aerosol-forming substrate in an efficient manner. As inductively heating the aerosol-forming substrate using a susceptor is a form of "contactless heating" there is no direct means to measure the temperature inside the consumable's aerosol-forming substrate itself—that is, there is no contact between the device and the inside of the consumable where the aerosol-forming substrate is.

An aerosol-generating article is provided comprising an aerosol-forming substrate and a susceptor for heating the aerosol-forming substrate. The susceptor comprises a first susceptor material and a second susceptor material, the first susceptor material being disposed in intimate physical contact with the second susceptor material. The second susceptor material preferably has a Curie temperature that is lower than 500° C. The first susceptor material is preferably used primarily to heat the susceptor when the susceptor is placed in a fluctuating electromagnetic field. Any suitable material may be used. For example the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys.

Preferably, the susceptor may comprise a first susceptor material having a first Curie temperature and a second susceptor material having a second Curie temperature, the first susceptor material being disposed in intimate physical contact with the second susceptor material. The second Curie temperature is preferably lower than the first Curie temperature. As used herein, the term 'second Curie temperature' refers to the Curie temperature of the second susceptor material.

By providing a susceptor having at least a first and a second susceptor material, with either the second susceptor material having a Curie temperature and the first susceptor material not having a Curie temperature, or first and second susceptor materials having first and second Curie temperatures distinct from one another, the heating of the aerosol-forming substrate and the temperature control of the heating may be separated. While the first susceptor material may be optimized with regard to heat loss and thus heating efficiency, the second susceptor material may be optimized in respect of temperature control. The second susceptor material need not have any pronounced heating characteristic. The second susceptor material may be selected to have a Curie temperature, or second Curie temperature, which corresponds to a predefined maximum desired heating temperature of the first susceptor material. The maximum desired heating temperature may be defined such that a local overheating or burning of the aerosol-forming substrate is avoided. The susceptor comprising the first and second susceptor materials has a unitary structure and may be termed a bi-material susceptor or a multi-material susceptor. The immediate proximity of the first and second susceptor materials may be of advantage in providing an accurate temperature control.

The first susceptor material is preferably a magnetic material having a Curie temperature that is above 500° C. It is desirable from the point of view of heating efficiency that the Curie temperature of the first susceptor material is above any maximum temperature that the susceptor should be capable of being heated to. The second Curie temperature may preferably be selected to be lower than 400° C., preferably lower than 380° C., or lower than 360° C. It is preferable that the second susceptor material is a magnetic material selected to have a second Curie temperature that is substantially the same as a desired maximum heating temperature. That is, it is preferable that the second Curie temperature is approximately the same as the temperature that the susceptor should be heated to in order to generate an aerosol from the aerosol-forming substrate. The second Curie temperature may, for example, be within the range of 200° C. to 400° C., or between 250° C. and 360° C.

In one embodiment, the second Curie temperature of the second susceptor material may be selected such that, upon being heated by a susceptor that is at a temperature equal to the second Curie temperature, an overall average temperature of the aerosol-forming substrate does not exceed 240° C. The overall average temperature of the aerosol-forming substrate here is defined as the arithmetic mean of a number of temperature measurements in central regions and in peripheral regions of the aerosol-forming substrate. By pre-defining a maximum for the overall average temperature the aerosol-forming substrate may be tailored to an optimum production of aerosol.

In preferred embodiments the aerosol-generating article may comprise a plurality of elements assembled within a wrapper in the form of a rod having a mouth end and a distal end upstream from the mouth end, the plurality of elements including the aerosol-forming substrate located at or towards the distal end of the rod. Preferably, the aerosol-forming substrate is a solid aerosol-forming substrate. Preferably, the susceptor is an elongate susceptor having a width of between 3 mm and 6 mm and a thickness of between 10 micrometres and 200 micrometres. The susceptor is preferably located within the aerosol-forming substrate. It is particularly preferred that an elongate susceptor is positioned in a radially central position within the aerosol-forming substrate, preferably such that it extends along the longitudinal axis of the aerosol-forming substrate. The length of an elongate susceptor is preferably between 8 mm and 15 mm, for example between 10 mm and 14 mm, for example about 12 mm or 13 mm.

The first susceptor material is preferably selected for maximum heating efficiency. Inductive heating of a magnetic susceptor material located in a fluctuating magnetic field occurs by a combination of resistive heating due to eddy currents induced in the susceptor, and heat generated by magnetic hysteresis losses. Preferably the first susceptor material is a ferromagnetic metal having a Curie temperature in excess of 400° C. Preferably the first susceptor is iron or an iron alloy such as a steel, or an iron nickel alloy. It may be particularly preferred that the first susceptor material is a 400 series stainless steel such as grade 410 stainless steel, or grade 420 stainless steel, or grade 430 stainless steel.

The first susceptor material may alternatively be a suitable non-magnetic material, such as aluminium. In a non-magnetic material inductive heating occurs solely by resistive heating due to eddy currents.

The second susceptor material is preferably selected for having a detectable Curie temperature within a desired range, for example at a specified temperature between 200° C. and 400° C. The second susceptor material may also make a contribution to heating of the susceptor, but this property is less important than its Curie temperature. Preferably the second susceptor material is a ferromagnetic metal such as nickel or a nickel alloy. Nickel has a Curie temperature of about 354° C., which may be ideal for temperature control of heating in an aerosol-generating article.

The first and second susceptor materials are in intimate contact forming a unitary susceptor. Thus, when heated the first and second susceptor materials have the same temperature. The first susceptor material, which may be optimized for the heating of the aerosol-forming substrate, may have a first Curie temperature which is higher than any predefined maximum heating temperature. Once the susceptor has reached the second Curie temperature, the magnetic properties of the second susceptor material change. At the second Curie temperature the second susceptor material reversibly changes from a ferromagnetic phase to a paramagnetic phase. During the inductive heating of the aerosol-forming substrate this phase-change of the second susceptor material may be detected without physical contact with the second susceptor material. Detection of the phase change may allow control over the heating of the aerosol-forming substrate. For example, on detection of the phase change associated with the second Curie temperature the inductive heating may be stopped automatically. Thus, an overheating of the aerosol-forming substrate may be avoided, even though the first susceptor material, which is primarily responsible for the heating of the aerosol-forming substrate, has no Curie temperature or a first Curie-temperature which is higher than the maximum desirable heating temperature. After the inductive heating has been stopped the susceptor cools down until it reaches a temperature lower than the second Curie temperature. At this point the second susceptor material regains its ferromagnetic properties again. This phase-change may be detected without contact with the second susceptor material and the inductive heating may then be activated again. Thus, the inductive heating of the aerosol-forming substrate may be controlled by a repeated activation and deactivation of the inductive heating device. This temperature control is accomplished by contactless means. Besides a circuitry and electronics which is preferably already integrated in the inductive heating device there may be no need for any additional circuitry and electronics.

Intimate contact between the first susceptor material and the second susceptor material may be made by any suitable means. For example, the second susceptor material may be plated, deposited, coated, clad or welded onto the first susceptor material. Preferred methods include electroplating, galvanic plating and cladding. It is preferred that the second susceptor material is present as a dense layer. A dense layer has a higher magnetic permeability than a porous layer, making it easier to detect fine changes at the Curie temperature. If the first susceptor material is optimised for heating of the substrate it may be preferred that there is no greater volume of the second susceptor material than is required to provide a detectable second Curie point.

In some embodiments it may be preferred that the first susceptor material is in the form of an elongate strip having a width of between 3 mm and 6 mm and a thickness of between 10 micrometres and 200 micrometres, and that the second susceptor material is in the form of discrete patches that are plated, deposited, or welded onto the first susceptor material. For example, the first susceptor material may be an elongate strip of grade 430 stainless steel or an elongate strip of aluminium and the second elongate material may be in the form of patches of nickel having a thickness of between 5 micrometres and 30 micrometres deposited at intervals along the elongate strip of the first susceptor material. Patches of the second susceptor material may have a width of between 0.5 mm and the thickness of the elongate strip. For example the width may be between 1 mm and 4 mm, or between 2 mm and 3 mm. Patches of the second susceptor material may have a length between 0.5 mm and about 10 mm, preferably between 1 mm and 4 mm, or between 2 mm and 3 mm.

In some embodiments it may be preferred that the first susceptor material and the second susceptor material are co-laminated in the form of an elongate strip having a width of between 3 mm and 6 mm and a thickness of between 10 micrometres and 200 micrometres. Preferably, the first susceptor material has a greater thickness than the second susceptor material. The co-lamination may be formed by any suitable means. For example, a strip of the first susceptor material may be welded or diffusion bonded to a strip of the second susceptor material. Alternatively, a layer of the second susceptor material may be deposited or plated onto a strip of the first susceptor material.

In some embodiments it may be preferred that the susceptor is an elongate susceptor having a width of between 3 mm and 6 mm and a thickness of between 10 micrometres and 200 micrometres, the susceptor comprising a core of the first susceptor material encapsulated by the second susceptor material. Thus, the susceptor may comprise a strip of the first susceptor material that has been coated or clad by the second susceptor material. As an example, the susceptor may comprise a strip of 430 grade stainless steel having a length of 12 mm, a width of 4 mm and a thickness of between 10 micrometres and 50 micrometres, for example 25 micrometres. The grade 430 stainless steel may be coated with a layer of nickel of between 5 micrometres and 15 micrometres, for example 10 micrometres.

The susceptor may be configured for dissipating energy of between 1 Watt and 8 Watt when used in conjunction with a particular inductor, for example between 1.5 Watt and 6 Watt. By configured, it is meant that the susceptor may comprise a specific first susceptor material and may have specific dimensions that allow energy dissipation of between 1 Watt and 8 Watt when used in conjunction with a particular conductor that generates a fluctuating magnetic field of known frequency and known field strength.

The aerosol-generating device may have more than one susceptor, for example more than one elongate susceptor. Thus, heating may be efficiently effected in different portions of the aerosol-forming substrate.

An aerosol-generating system is also provided comprising an electrically-operated aerosol-generating device having an inductor for producing an alternating or fluctuating electromagnetic field, and an aerosol-generating article comprising a susceptor as described and defined herein. The aerosol-generating article engages with the aerosol-generating device such that the fluctuating electromagnetic field produced by the inductor induces a current in the susceptor, causing the susceptor to heat up. The electrically-operated aerosol-generating device comprises electronic circuitry configured to detect the Curie transition of the second susceptor material. For example, the electronic circuitry may indirectly measure the apparent resistance (Ra) of the susceptor. The apparent resistance changes in the susceptor when one of the materials undergoes a phase change associated with the Curie temperature. Ra may be indirectly measured by measuring the DC current used to produce the fluctuating magnetic field.

Preferably, the electronic circuitry is adapted for a closed loop control of the heating of the aerosol-forming substrate. Thus, the electronic circuitry may switch off the fluctuating magnetic field when it detects that the temperature of the susceptor has increased above the second Curie temperature. The magnetic field may be switched on again when the temperature of the susceptor has decreased below the second Curie temperature. Alternatively, the power duty cycle that drives the magnetic field may be reduced when the temperature of the susceptor increases above the second Curie temperature and decreased when the temperature of the susceptor decreases below the second Curie temperature.

Thus, the temperature of the susceptor may be maintained to be at the temperature of the second Curie temperature plus or minus 20° C. for a predetermined period of time, thereby allowing an aerosol to be formed without overheating the aerosol-forming substrate. Preferably the electronic circuitry provides a feedback loop that allows the temperature of the susceptor to be controlled to within plus or minus 15° C. of the second Curie temperature, preferably within plus or minus 10° C. of the second Curie temperature, preferably between plus or minus 5° C. of the second Curie temperature.

The electrically-operated aerosol-generating device is preferably capable of generating a fluctuating electromagnetic field having a magnetic field strength (H-field strength) of between 1 and 5 kilo amperes per metre (kA/m), preferably between 2 and 3 kA/m, for example about 2.5 kA/m. The electrically-operated aerosol-generating device is preferably capable of generating a fluctuating electromagnetic field having a frequency of between 1 and 30 MHz, for example between 1 and 10 MHz, for example between 5 and 7 MHz.

The susceptor is part of a consumable aerosol-generating article, and is only used once. Thus, any residues that form on the susceptor during heating do not cause a problem for heating of a subsequent aerosol-generating article. The flavour of a sequence of aerosol-generating articles may be more consistent due to the fact that a fresh susceptor acts to heat each article. Furthermore, cleaning of the aerosol-generating device is less critical and may be achieved without damage to a heating element. Furthermore, the lack of a heating element that needs to penetrate an aerosol-forming substrate means that insertion and removal of an aerosol-generating article into an aerosol-generating device is less likely to cause inadvertent damage to either the article or the device. The overall aerosol-generating system is, therefore, more robust.

As used herein, the term 'aerosol-forming substrate' is used to describe a substrate capable of releasing, upon heating, volatile compounds, which can form an aerosol. The aerosol generated from aerosol-forming substrates of aerosol-generating articles described herein may be visible or invisible and may include vapours (for example, fine particles of substances, which are in a gaseous state, that are ordinarily liquid or solid at room temperature) as well as gases and liquid droplets of condensed vapours.

As used herein, the terms 'upstream' and 'downstream' are used to describe the relative positions of elements, or portions of elements, of the aerosol-generating article in relation to the direction in which a user draws on the aerosol-generating article during use thereof.

The aerosol-generating article is preferably in the form of a rod that comprises two ends: a mouth end, or proximal end, through which aerosol exits the aerosol-generating article and is delivered to a user, and a distal end. In use, a user may draw on the mouth end in order to inhale aerosol generated by the aerosol-generating article. The mouth end is downstream of the distal end. The distal end may also be referred to as the upstream end and is upstream of the mouth end.

Preferably, the aerosol-generating article is a smoking article that generates an aerosol that is directly inhalable into a user's lungs through the user's mouth. More, preferably, the aerosol-generating article is a smoking article that generates a nicotine-containing aerosol that is directly inhalable into a user's lungs through the user's mouth.

As used herein, the term 'aerosol-generating device' is used to describe a device that interacts with an aerosol-forming substrate of an aerosol-generating article to generate an aerosol. Preferably, the aerosol-generating device is a smoking device that interacts with an aerosol-forming substrate of an aerosol-generating article to generate an aerosol that is directly inhalable into a user's lungs thorough the user's mouth. The aerosol-generating device may be a holder for a smoking article.

When used herein in relation to an aerosol-generating article, the term 'longitudinal' is used to describe the direction between the mouth end and the distal end of the aerosol-generating article and the term 'transverse' is used to describe the direction perpendicular to the longitudinal direction.

When used herein in relation to an aerosol-generating article, the term 'diameter' is used to describe the maximum dimension in the transverse direction of the aerosol-generating article. When used herein in relation to an aerosol-generating article, the term 'length' is used to describe the maximum dimension in the longitudinal direction of the aerosol-generating article.

As used herein, the term 'susceptor' refers to a material that can convert electromagnetic energy into heat. When located within a fluctuating electromagnetic field, eddy currents induced in the susceptor cause heating of the susceptor. Furthermore, magnetic hysteresis losses within the susceptor cause additional heating of the susceptor. As the susceptor is located in thermal contact with the aerosol-forming substrate, the aerosol-forming substrate is heated by the susceptor.

The aerosol-generating article is preferably designed to engage with an electrically-operated aerosol-generating device comprising an induction heating source. The induction heating source, or inductor, generates the fluctuating electromagnetic field for heating a susceptor located within the fluctuating electromagnetic field. In use, the aerosol-generating article engages with the aerosol-generating device such that the susceptor is located within the fluctuating electromagnetic field generated by the inductor.

The susceptor preferably has a length dimension that is greater than its width dimension or its thickness dimension, for example greater than twice its width dimension or its thickness dimension. Thus the susceptor may be described as an elongate susceptor. The susceptor may be arranged substantially longitudinally within the rod. This means that the length dimension of the elongate susceptor is arranged to be approximately parallel to the longitudinal direction of the rod, for example within plus or minus 10 degrees of parallel to the longitudinal direction of the rod. In preferred embodiments, the elongate susceptor element may be positioned in a radially central position within the rod, and extends along the longitudinal axis of the rod.

The susceptor may be in the form of a pin, rod, or blade comprising the first susceptor material and the second susceptor material. The susceptor may have a length of between 5 mm and 15 mm, for example between 6 mm and 12 mm, or between 8 mm and 10 mm. The susceptor may have a width of between 1 mm and 6 mm and may have a thickness of between 10 micrometres and 500 micrometres, or even more preferably between 10 and 100 micrometres. If the susceptor has a constant cross-section, for example a circular cross-section, it has a preferable width or diameter of between 1 mm and 5 mm.

Preferred susceptors may be heated to a temperature in excess of 250° C. Suitable susceptors may comprise a non-metallic core with a metal layer disposed on the non-metallic core, for example metallic tracks of the first and second susceptor materials formed on a surface of a ceramic core.

A susceptor may have a protective external layer, for example a protective ceramic layer or protective glass layer encapsulating the first and second susceptor material. The susceptor may comprise a protective coating formed by a glass, a ceramic, or an inert metal, formed over a core comprising the first and second susceptor materials.

The susceptor is arranged in thermal contact with the aerosol-forming substrate. Thus, when the susceptor heats up the aerosol-forming substrate is heated up and an aerosol is formed. Preferably the susceptor is arranged in direct physical contact with the aerosol-forming substrate, for example within the aerosol-forming substrate.

The aerosol-generating article may contain a single elongate susceptor. Alternatively, the aerosol-generating article may comprise more than one elongate susceptor.

Preferably, the aerosol-forming substrate is a solid aerosol-forming substrate. The aerosol-forming substrate may comprise both solid and liquid components.

Preferably, the aerosol-forming substrate comprises nicotine. In some preferred embodiments, the aerosol-forming substrate comprises tobacco. For example, the aerosol-forming material may be formed from a sheet of homogenised tobacco. The aerosol-forming substrate may be a rod formed by gathering a sheet of homogenised tobacco.

Alternatively, or in addition, the aerosol-forming substrate may comprise a non-tobacco containing aerosol-forming material. For example, the aerosol-forming material may be formed from a sheet comprising a nicotine salt and an aerosol former.

If the aerosol-forming substrate is a solid aerosol-forming substrate, the solid aerosol-forming substrate may comprise, for example, one or more of: powder, granules, pellets, shreds, strands, strips or sheets containing one or more of: herb leaf, tobacco leaf, tobacco ribs, expanded tobacco and homogenised tobacco.

Optionally, the solid aerosol-forming substrate may contain tobacco or non-tobacco volatile flavour compounds, which are released upon heating of the solid aerosol-forming substrate. The solid aerosol-forming substrate may also contain one or more capsules that, for example, include additional tobacco volatile flavour compounds or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, strands, strips or sheets. The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

As used herein, the term 'homogenised tobacco material' denotes a material formed by agglomerating particulate tobacco.

As used herein, the term 'sheet' denotes a laminar element having a width and length substantially greater than the thickness thereof.

As used herein, the term 'gathered' is used to describe a sheet that is convoluted, folded, or otherwise compressed or constricted substantially transversely to the longitudinal axis of the aerosol-generating article.

In a preferred embodiment, the aerosol-forming substrate comprises a gathered textured sheet of homogenised tobacco material.

As used herein, the term 'textured sheet' denotes a sheet that has been crimped, embossed, debossed, perforated or otherwise deformed. The aerosol-forming substrate may comprise a gathered textured sheet of homogenised tobacco material comprising a plurality of spaced-apart indentations, protrusions, perforations or a combination thereof.

In a particularly preferred embodiment, the aerosol-forming substrate comprises a gathered crimped sheet of homogenised tobacco material.

Use of a textured sheet of homogenised tobacco material may advantageously facilitate gathering of the sheet of homogenised tobacco material to form the aerosol-forming substrate.

As used herein, the term 'crimped sheet' denotes a sheet having a plurality of substantially parallel ridges or corrugations. Preferably, when the aerosol-generating article has been assembled, the substantially parallel ridges or corrugations extend along or parallel to the longitudinal axis of the aerosol-generating article. This advantageously facilitates gathering of the crimped sheet of homogenised tobacco material to form the aerosol-forming substrate. However, it will be appreciated that crimped sheets of homogenised tobacco material for inclusion in the aerosol-generating article may alternatively or in addition have a plurality of substantially parallel ridges or corrugations that are disposed at an acute or obtuse angle to the longitudinal axis of the aerosol-generating article when the aerosol-generating article has been assembled.

The aerosol-forming substrate may be in the form of a plug comprising an aerosol-forming material circumscribed by a paper or other wrapper. Where an aerosol-forming substrate is in the form of a plug, the entire plug including any wrapper is considered to be the aerosol-forming substrate.

In a preferred embodiment, the aerosol-forming substrate comprises a plug comprising a gathered sheet of homogenised tobacco material, or other aerosol-forming material, circumscribed by a wrapper. Preferably the susceptor is an elongate susceptor and the, or each, elongate susceptor is positioned within the plug in direct contact with the aerosol-forming material.

As used herein, the term 'aerosol former' is used to describe any suitable known compound or mixture of compounds that, in use, facilitates formation of an aerosol and that is substantially resistant to thermal degradation at the operating temperature of the aerosol-generating article.

Suitable aerosol-formers are known in the art and include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate Preferred aerosol formers are polyhydric alcohols or mixtures thereof, such as propylene glycol, triethylene glycol, 1,3-butanediol and, most preferred, glycerine.

The aerosol-forming substrate may comprise a single aerosol former. Alternatively, the aerosol-forming substrate may comprise a combination of two or more aerosol formers.

Preferably, the aerosol-forming substrate has an aerosol former content of greater than 5% on a dry weight basis.

The aerosol aerosol-forming substrate may have an aerosol former content of between approximately 5% and approximately 30% on a dry weight basis.

In a preferred embodiment, the aerosol-forming substrate has an aerosol former content of approximately 20% on a dry weight basis.

Aerosol-forming substrates comprising gathered sheets of homogenised tobacco for use in the aerosol-generating article may be made by methods known in the art, for example the methods disclosed in WO 2012/164009 A2.

Preferably, the aerosol-forming substrate has an external diameter of at least 5 mm. The aerosol-forming substrate may have an external diameter of between approximately 5 mm and approximately 12 mm, for example of between approximately 5 mm and approximately 10 mm or of between approximately 6 mm and approximately 8 mm. In a preferred embodiment, the aerosol-forming substrate has an external diameter of 7.2 mm+/−10%.

The aerosol-forming substrate may have a length of between approximately 5 mm and approximately 15 mm, for example between about 8 mm and about 12 mm. In one embodiment, the aerosol-forming substrate may have a length of approximately 10 mm. In a preferred embodiment, the aerosol-forming substrate has a length of approximately 12 mm. Preferably, the elongate susceptor is approximately the same length as the aerosol-forming substrate.

Preferably, the aerosol-forming substrate is substantially cylindrical.

A support element may be located immediately downstream of the aerosol-forming substrate and may abut the aerosol-forming substrate.

The support element may be formed from any suitable material or combination of materials. For example, the support element may be formed from one or more materials selected from the group consisting of: cellulose acetate; cardboard; crimped paper, such as crimped heat resistant paper or crimped parchment paper; and polymeric materials, such as low density polyethylene (LDPE). In a preferred embodiment, the support element is formed from cellulose acetate.

The support element may comprise a hollow tubular element. In a preferred embodiment, the support element comprises a hollow cellulose acetate tube.

The support element preferably has an external diameter that is approximately equal to the external diameter of the aerosol-generating article.

The support element may have an external diameter of between approximately 5 millimetres and approximately 12 millimetres, for example of between approximately 5 millimetres and approximately 10 millimetres or of between approximately 6 millimetres and approximately 8 millimetres. In a preferred embodiment, the support element has an external diameter of 7.2 millimetres+/−10%.

The support element may have a length of between approximately 5 millimetres and approximately 15 mm. In a preferred embodiment, the support element has a length of approximately 8 millimetres.

An aerosol-cooling element may be located downstream of the aerosol-forming substrate, for example an aerosol-cooling element may be located immediately downstream of a support element, and may abut the support element.

The aerosol-cooling element may be located between the support element and a mouthpiece located at the extreme downstream end of the aerosol-generating article.

The aerosol-cooling element may have a total surface area of between approximately 300 square millimetres per millimetre length and approximately 1000 square millimetres per millimetre length. In a preferred embodiment, the aerosol-cooling element has a total surface area of approximately 500 square millimetres per millimetre length.

The aerosol-cooling element may be alternatively termed a heat exchanger.

The aerosol-cooling element preferably has a low resistance to draw. That is, the aerosol-cooling element preferably offers a low resistance to the passage of air through the aerosol-generating article. Preferably, the aerosol-cooling element does not substantially affect the resistance to draw of the aerosol-generating article.

The aerosol-cooling element may comprise a plurality of longitudinally extending channels. The plurality of longitudinally extending channels may be defined by a sheet material that has been one or more of crimped, pleated, gathered and folded to form the channels. The plurality of longitudinally extending channels may be defined by a single sheet that has been one or more of crimped, pleated, gathered and folded to form multiple channels. Alternatively, the plurality of longitudinally extending channels may be defined by multiple sheets that have been one or more of crimped, pleated, gathered and folded to form multiple channels.

In some embodiments, the aerosol-cooling element may comprise a gathered sheet of material selected from the group consisting of metallic foil, polymeric material, and substantially non-porous paper or cardboard. In some embodiments, the aerosol-cooling element may comprise a gathered sheet of material selected from the group consisting of polyethylene (PE), polypropylene (PP), polyvinylchloride (PVC), polyethylene terephthalate (PET), polylactic acid (PLA), cellulose acetate (CA), and aluminium foil.

In a preferred embodiment, the aerosol-cooling element comprises a gathered sheet of biodegradable material. For example, a gathered sheet of non-porous paper or a gathered sheet of biodegradable polymeric material, such as polylactic acid or a grade of Mater-Bi® (a commercially available family of starch based copolyesters).

In a particularly preferred embodiment, the aerosol-cooling element comprises a gathered sheet of polylactic acid.

The aerosol-cooling element may be formed from a gathered sheet of material having a specific surface area of between approximately 10 square millimetres per milligram and approximately 100 square millimetres per milligram weight. In some embodiments, the aerosol-cooling element may be formed from a gathered sheet of material having a specific surface area of approximately 35 mm2/mg.

The aerosol-generating article may comprise a mouthpiece located at the mouth end of the aerosol-generating article. The mouthpiece may be located immediately downstream of an aerosol-cooling element and may abut the aerosol-cooling element. The mouthpiece may comprise a filter. The filter may be formed from one or more suitable filtration materials. Many such filtration materials are known in the art. In one embodiment, the mouthpiece may comprise a filter formed from cellulose acetate tow.

The mouthpiece preferably has an external diameter that is approximately equal to the external diameter of the aerosol-generating article.

The mouthpiece may have an external diameter of a diameter of between approximately 5 millimetres and approximately 10 millimetres, for example of between approximately 6 millimetres and approximately 8 millimetres. In a preferred embodiment, the mouthpiece has an external diameter of 7.2 millimetres+/−10%.

The mouthpiece may have a length of between approximately 5 millimetres and approximately 20 millimetres. In a preferred embodiment, the mouthpiece has a length of approximately 14 millimetres.

The mouthpiece may have a length of between approximately 5 millimetres and approximately 14 millimetres. In a preferred embodiment, the mouthpiece has a length of approximately 7 millimetres.

The elements of the aerosol-forming article, for example the aerosol-forming substrate and any other elements of the aerosol-generating article such as a support element, an aerosol-cooling element, and a mouthpiece, are circumscribed by an outer wrapper. The outer wrapper may be formed from any suitable material or combination of materials. Preferably, the outer wrapper is a cigarette paper.

The aerosol-generating article may have an external diameter of between approximately 5 millimetres and approximately 12 millimetres, for example of between approximately 6 millimetres and approximately 8 millimetres. In a preferred embodiment, the aerosol-generating article has an external diameter of 7.2 millimetres+/−10%.

The aerosol-generating article may have a total length of between approximately 30 millimetres and approximately 100 millimetres. In preferred embodiments, the aerosol-generating article has a total length of between 40 mm and 50 mm, for example approximately 45 millimetres.

The aerosol-generating device of the aerosol-generating system may comprise: a housing; a cavity for receiving the aerosol-generating article, an inductor arranged to generate a fluctuating electromagnetic field within the cavity; an electrical power supply connected to the inductor; and a control element configured to control the supply of power from the power supply to the inductor.

In preferred embodiments the device may comprise a DC power source, such as a rechargeable battery, for providing a DC supply voltage and a DC current, power supply electronics comprising a DC/AC inverter for converting the DC current into an AC current for supply to the inductor. The aerosol-generating device may further comprise an impedance matching network between the DC/AC inverter and the inductor to improve power transfer efficiency between the inverter and the inductor.

The control element is preferably coupled to, or comprises, a monitor or monitoring means for monitoring the DC current provided by the DC power source. The DC current may provide an indirect indication of the apparent resistance of a susceptor located in the electromagnetic field, which in turn may provide a means of detecting a Curie transition in the susceptor.

The inductor may comprise one or more coils that generate a fluctuating electromagnetic field. The coil or coils may surround the cavity.

Preferably the device is capable of generating a fluctuating electromagnetic field of between 1 and 30 MHz, for example, between 2 and 10 MHz, for example between 5 and 7 MHz.

Preferably the device is capable of generating a fluctuating electromagnetic field having a field strength (H-field) of between 1 and 5 kA/m, for example between 2 and 3 kA/m, for example about 2.5 kA/m.

Preferably, the aerosol-generating device is a portable or handheld aerosol-generating device that is comfortable for a user to hold between the fingers of a single hand.

The aerosol-generating device may be substantially cylindrical in shape

The aerosol-generating device may have a length of between approximately 70 millimetres and approximately 120 millimetres.

The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The control element may be a simple switch. Alternatively the control element may be electric circuitry and may comprise one or more microprocessors or microcontrollers.

The aerosol-generating system may comprise such an aerosol-generating device and one or more aerosol-generating articles comprising a susceptor as described above, the aerosol-generating articles being configured to be received in a cavity of the aerosol-generating device such that the susceptor located within the aerosol-generating article is positioned within a fluctuating electromagnetic field generated by the inductor.

A method of using an aerosol-generating article as described above may comprise the steps of positioning the article relative to an electrically-operated aerosol-generating device such that the elongate susceptor of the article is within a fluctuating electromagnetic field generated by the device, the fluctuating electromagnetic field causing the susceptor to heat up, and monitoring at least one parameter of the electrically-operated aerosol-generating device to detect the Curie transition of the second susceptor material. For example the DC current supplied by the power supply may be monitored to provide an indirect measurement of the apparent resistance in the susceptor. The electromagnetic field may be controlled so as to maintain the temperature of the susceptor to be approximately the same temperature as the Curie transition of the second susceptor material. The electromagnetic field may be switched off and on to maintain the temperature of the susceptor within desired bounds. The duty cycle of the device may be altered to maintain the temperature of the susceptor within desired bounds.

The electrically-operated aerosol-generating device may be any device described herein. Preferably the frequency of the fluctuating electromagnetic field is maintained to be between 1 and 30 MHz, for example between 5 and 7 MHz.

A method of producing an aerosol-generating article as described or defined herein may comprise the steps of, assembling a plurality of elements in the form of a rod having a mouth end and a distal end upstream from the mouth end, the plurality of elements including an aerosol-forming substrate and a susceptor, preferably an elongate susceptor element arranged substantially longitudinally within the rod, in thermal contact with the aerosol-forming substrate. The susceptor is preferably in direct contact with the aerosol-forming substrate.

Advantageously, the aerosol-forming substrate may be produced by gathering at least one sheet of aerosol-forming material and circumscribing the gathered sheet by a wrapper. A suitable method of producing such an aerosol-forming substrate for a heated aerosol-generating article is disclosed in WO2012164009. The sheet of aerosol-forming material may be a sheet of homogenised tobacco. Alternatively, the sheet of aerosol-forming material may be a non-tobacco material, for example a sheet comprising a nicotine salt and an aerosol former.

An elongate susceptor, or each elongate susceptor, may be inserted into the aerosol-forming substrate prior to the aerosol-forming substrate being assembled with other elements to form an aerosol-generating article. Alternatively, the aerosol-forming substrate may be assembled with other elements prior to the susceptor being inserted into the aerosol-forming substrate.

Features described in relation to one aspect or embodiment may also be applicable to other aspects and embodiments. Specific embodiments will now be described with reference to the figures, in which.

Inductive heating is a known phenomenon described by Faraday's law of induction and Ohm's law. More specifically, Faraday's law of induction states that if the magnetic induction in a conductor is changing, a changing electric field is produced in the conductor. Since this electric field is produced in a conductor, a current, known as an eddy current, will flow in the conductor according to Ohm's law. The eddy current will generate heat proportional to the current density and the conductor resistivity. A conductor which is capable of being inductively heated is known as a susceptor material. The present invention employs an inductive heating device equipped with an inductive heating source, such as, e.g., an induction coil, which is capable of generating an alternating electromagnetic field from an AC source such as an LC circuit. Heat generating eddy currents are produced in the susceptor material which is in thermal proximity to an aerosol-forming substrate which is capable of releasing volatile compounds that can form an aerosol upon heating. The primary heat transfer mechanisms from the susceptor material to the solid material are conduction, radiation and possibly convection.

Figure 1A:
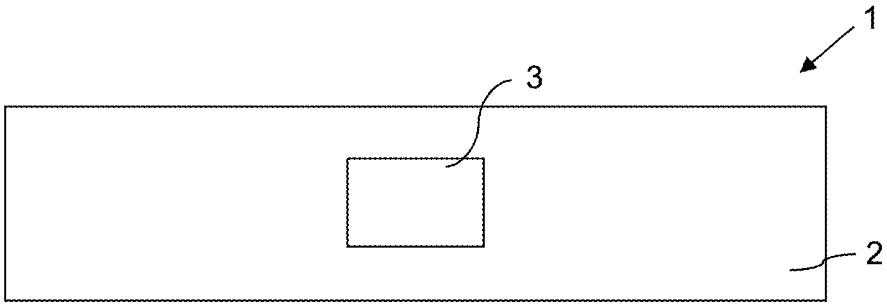
FIG. 1A is a plan view of a susceptor for use in an aerosol-generating article according to an embodiment of the invention.
Figure 1B:
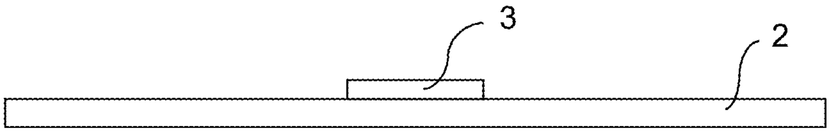
FIG. 1B is a side view of the susceptor of FIG. 1A.

FIG. 1A and FIG. 1B illustrate a specific example of a unitary multi-material susceptor for use in an aerosol-generating article according to an embodiment of the invention. The susceptor 1 is in the form of an elongate strip having a length of 12 mm and a width of 4 mm. The susceptor is formed from a first susceptor material 2 that is intimately coupled to a second susceptor material 3. The first susceptor material 2 is in the form of a strip of grade 430 stainless steel having dimensions of 12 mm by 4 mm by 35 millimetres. The second susceptor material 3 is a patch of nickel of dimensions 3 mm by 2 mm by 10 micrometres. The patch of nickel has been electroplated onto the strip of stainless steel. Grade 430 stainless steel is a ferromagnetic material having a Curie temperature in excess of 400° C. Nickel is a ferromagnetic material having a Curie temperature of about 354° C.

In further embodiments the material forming the first and second susceptor materials may be varied. In further embodiments there may be more than one patch of the second susceptor material located in intimate contact with the first susceptor material.

Figure 2A:
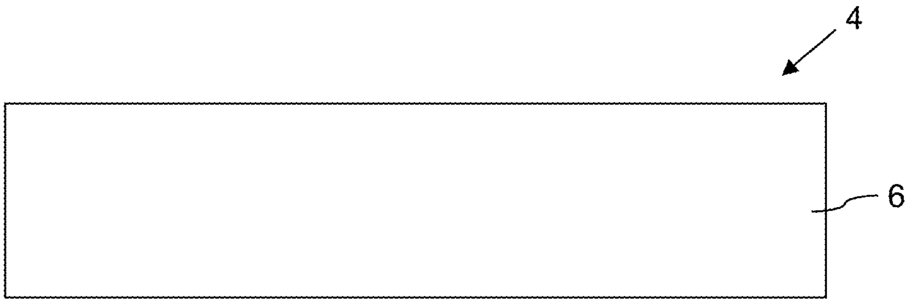
FIG. 2A is a plan view of a second susceptor for use in an aerosol-generating article according to an embodiment of the invention.
Figure 2B:
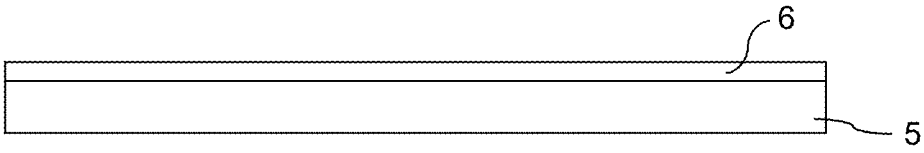
FIG. 2B is a side view of the susceptor of FIG. 2A.

FIG. 2A and FIG. 2B illustrate a second specific example of a unitary multi-material susceptor for use in an aerosol-generating article according to an embodiment of the invention. The susceptor 4 is in the form of an elongate strip having a length of 12 mm and a width of 4 mm. The susceptor is formed from a first susceptor material 5 that is intimately coupled to a second susceptor material 6. The first susceptor material 5 is in the form of a strip of grade 430 stainless steel having dimensions of 12 mm by 4 mm by 25 millimetres. The second susceptor material 6 is in the form of a strip of nickel having dimensions of 12 mm by 4 mm by 10 micrometres. The susceptor is formed by cladding the strip of nickel 6 to the strip of stainless steel 5. The total thickness of the susceptor is 35 millimetres. The susceptor 4 of FIG. 2 may be termed a bi-layer or multilayer susceptor.

Figure 3:
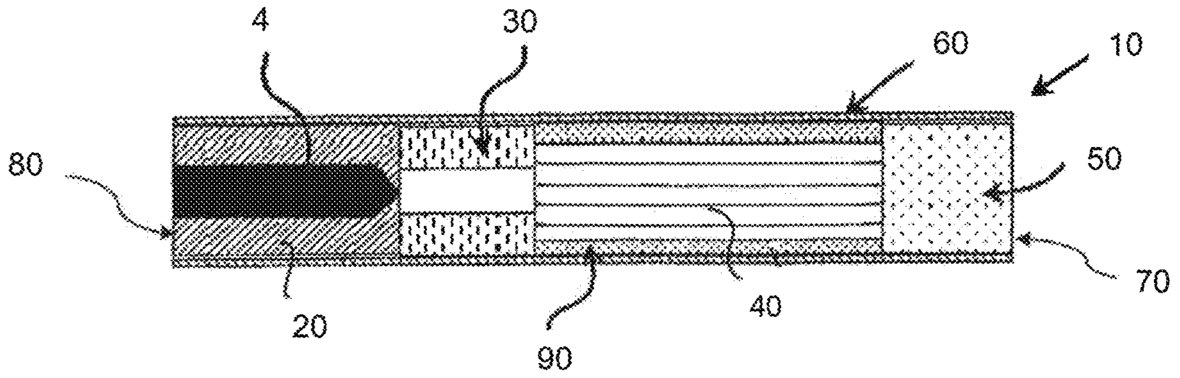
FIG. 3 is a schematic cross-sectional illustration of a specific embodiment of an aerosol-generating article incorporating a susceptor as illustrated in FIGS. 2A and 2B.

FIG. 3 illustrates an aerosol-generating article 10 according to a preferred embodiment. The aerosol-generating article 10 comprises four elements arranged in coaxial alignment: an aerosol-forming substrate 20, a support element 30, an aerosol-cooling element 40, and a mouthpiece 50. Each of these four elements is a substantially cylindrical element, each having substantially the same diameter. These four elements are arranged sequentially and are circumscribed by an outer wrapper 60 to form a cylindrical rod. An elongate bi-layer susceptor 4 is located within the aerosol-forming substrate, in contact with the aerosol-forming substrate. The susceptor 4 is the susceptor described above in relation to FIG. 2. The susceptor 4 has a length (12 mm) that is approximately the same as the length of the aerosol-forming substrate, and is located along a radially central axis of the aerosol-forming substrate.

The aerosol-generating article 10 has a proximal or mouth end 70, which a user inserts into his or her mouth during use, and a distal end 80 located at the opposite end of the aerosol-generating article 10 to the mouth end 70. Once assembled, the total length of the aerosol-generating article 10 is about 45 mm and the diameter is about 7.2 mm.

In use air is drawn through the aerosol-generating article by a user from the distal end 80 to the mouth end 70. The distal end 80 of the aerosol-generating article may also be described as the upstream end of the aerosol-generating article 10 and the mouth end 70 of the aerosol-generating article 10 may also be described as the downstream end of the aerosol-generating article 10. Elements of the aerosol-generating article 10 located between the mouth end 70 and the distal end 80 can be described as being upstream of the mouth end 70 or, alternatively, downstream of the distal end 80.

The aerosol-forming substrate 20 is located at the extreme distal or upstream end 80 of the aerosol-generating article 10. In the embodiment illustrated in FIG. 3, the aerosol-forming substrate 20 comprises a gathered sheet of crimped homogenised tobacco material circumscribed by a wrapper. The crimped sheet of homogenised tobacco material comprises glycerine as an aerosol-former.

The support element 30 is located immediately downstream of the aerosol-forming substrate 20 and abuts the aerosol-forming substrate 20. In the embodiment shown in FIG. 3, the support element is a hollow cellulose acetate tube. The support element 30 locates the aerosol-forming substrate 20 at the extreme distal end 80 of the aerosol-generating article. The support element 30 also acts as a spacer to space the aerosol-cooling element 40 of the aerosol-generating article 10 from the aerosol-forming substrate 20.

The aerosol-cooling element 40 is located immediately downstream of the support element 30 and abuts the support element 30. In use, volatile substances released from the aerosol-forming substrate 20 pass along the aerosol-cooling element 40 towards the mouth end 70 of the aerosol-generating article 10. The volatile substances may cool within the aerosol-cooling element 40 to form an aerosol that is inhaled by the user. In the embodiment illustrated in FIG. 3, the aerosol-cooling element comprises a crimped and gathered sheet of polylactic acid circumscribed by a wrapper 90. The crimped and gathered sheet of polylactic acid defines a plurality of longitudinal channels that extend along the length of the aerosol-cooling element 40.

The mouthpiece 50 is located immediately downstream of the aerosol-cooling element 40 and abuts the aerosol-cooling element 40. In the embodiment illustrated in FIG. 3, the mouthpiece 50 comprises a conventional cellulose acetate tow filter of low filtration efficiency.

To assemble the aerosol-generating article 10, the four cylindrical elements described above are aligned and tightly wrapped within the outer wrapper 60. In the embodiment illustrated in FIG. 3, the outer wrapper is a conventional cigarette paper. The susceptor 4 may be inserted into the aerosol-forming substrate 20 during the process used to form the aerosol-forming substrate, prior to the assembly of the plurality of elements to form a rod.

The aerosol-generating article 10 illustrated in FIG. 3 is designed to engage with an electrically-operated aerosol-generating device comprising an induction coil, or inductor, in order to be smoked or consumed by a user.

Figure 4:
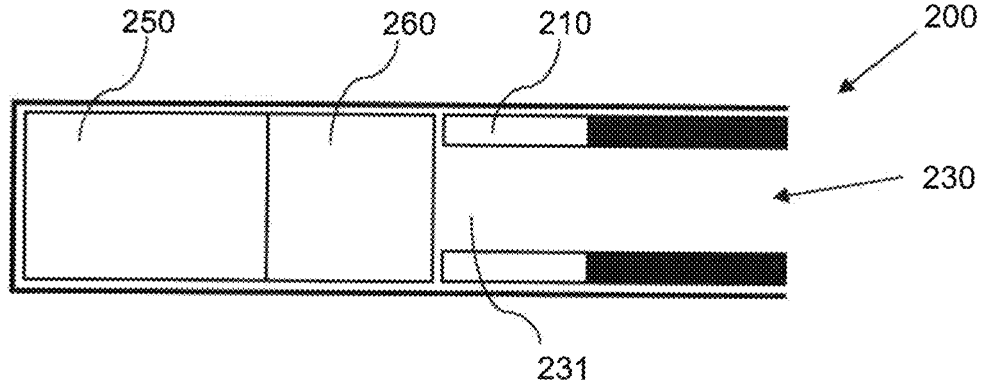
FIG. 4 is a schematic cross-sectional illustration of a specific embodiment of an electrically-operated aerosol-generating device for use with the aerosol-generating article illustrated in FIG. 3.

A schematic cross-sectional illustration of an electrically-operated aerosol-generating device 200 is shown in FIG. 4. The aerosol-generating device 200 comprises an inductor 210. As shown in FIG. 4, the inductor 210 is located adjacent a distal portion 231 of a substrate receiving chamber 230 of the aerosol-generating device 200. In use, the user inserts an aerosol-generating article 10 into the substrate receiving chamber 230 of the aerosol-generating device 200 such that the aerosol-forming substrate 20 of the aerosol-generating article 10 is located adjacent to the inductor 210.

The aerosol-generating device 200 comprises a battery 250 and electronics 260 that allow the inductor 210 to be actuated. Such actuation may be manually operated or may occur automatically in response to a user drawing on an aerosol-generating article 10 inserted into the substrate receiving chamber 230 of the aerosol-generating device 200. The battery 250 supplies a DC current. The electronics include a DC/AC inverter for supplying the inductor with a high frequency AC current.

Figure 5:
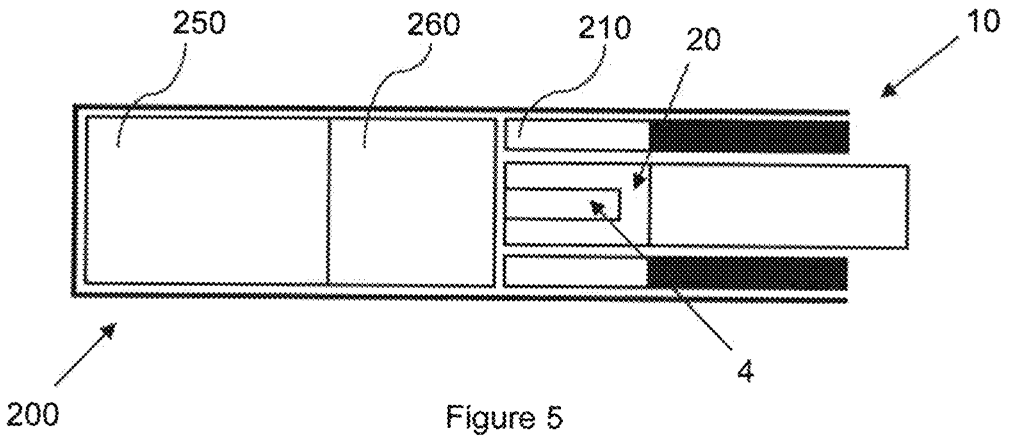
FIG. 5 is a schematic cross-sectional illustration of the aerosol-generating article of FIG. 3 in engagement with the electrically-operated aerosol-generating device of FIG. 4.

When the device is actuated, a high-frequency alternating current is passed through coils of wire that form part of the inductor. This causes the inductor 210 to generate a fluctuating electromagnetic field within the distal portion 231 of the substrate receiving cavity 230 of the device. The electromagnetic field preferably fluctuates with a frequency of between 1 and 30 MHz, preferably between 2 and 10 MHz, for example between 5 and 7 MHz. When an aerosol-generating article 10 is correctly located in the substrate receiving cavity 230, the susceptor 4 of the article 10 is located within this fluctuating electromagnetic field. The fluctuating field generates eddy currents within the susceptor, which is heated as a result. Further heating is provided by magnetic hysteresis losses within the susceptor. The heated susceptor heats the aerosol-forming substrate 20 of the aerosol-generating article 10 to a sufficient temperature to form an aerosol. The aerosol is drawn downstream through the aerosol-generating article 10 and inhaled by the user. FIG. 5 illustrates an aerosol-generating article in engagement with an electrically-operated aerosol-generating device.

Figure 6:
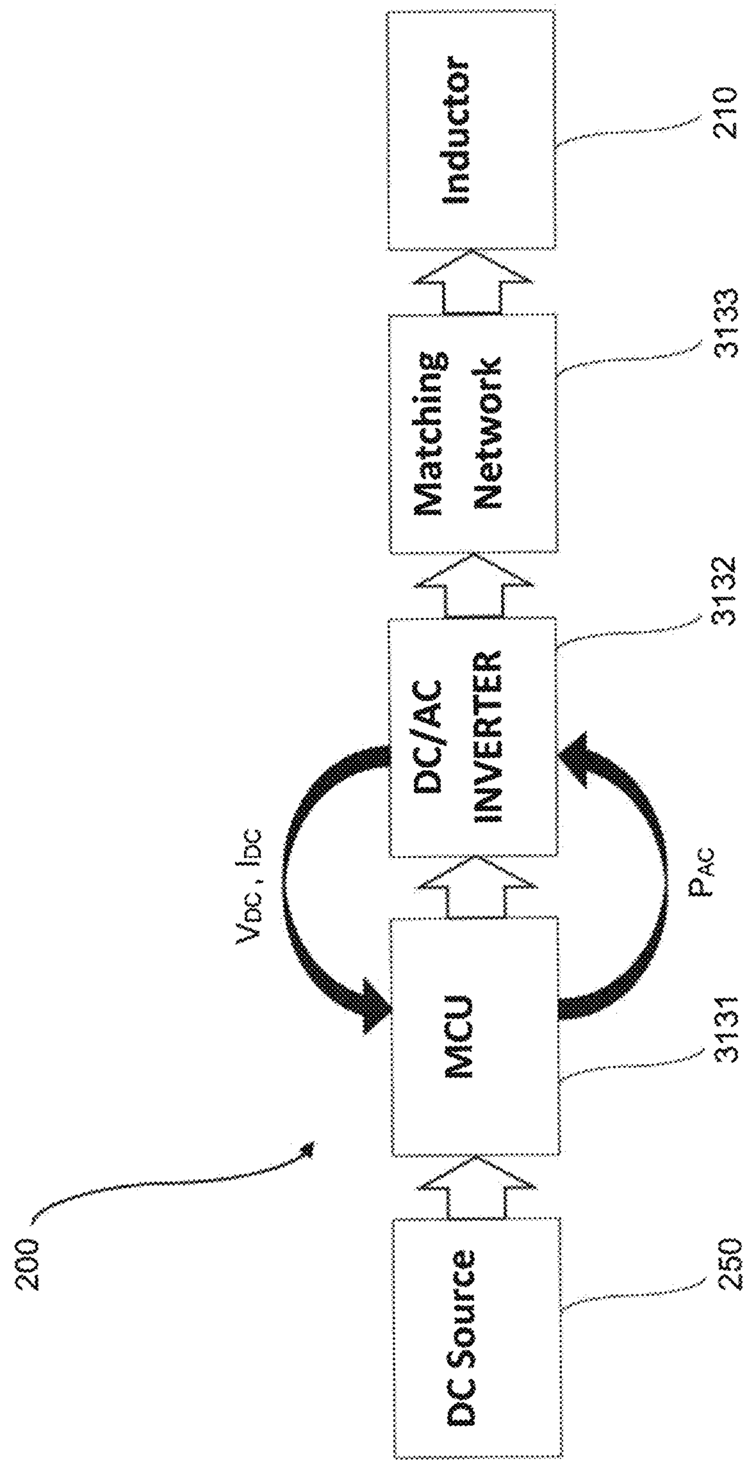
FIG. 6 is a block diagram showing electronic components of the aerosol-generating device described in relation to FIG. 4.

FIG. 6 is a block diagram showing electronic components of the aerosol-generating device 200 described in relation to FIG. 4. The aerosol-generating device 200 comprises a DC power source 250 (the battery), a microcontroller (microprocessor control unit) 3131, a DC/AC inverter 3132, a matching network 3133 for adaptation to the load, and an inductor 210. The microprocessor control unit 3131, DC/AC inverter 3132 and matching network 3133 are all part of the power supply electronics 260. The DC supply voltage VDC and the DC current IDC drawn from the DC power source 250 are provided by feed-back channels to the microprocessor control unit 3131, preferably by measurement of both the DC supply voltage VDC and the DC current IDC drawn from the DC power source 250 to control the further supply of AC power PAC to the inductor 3134. A matching network 3133 may be provided for optimum adaptation to the load but is not essential.

Figure 7:
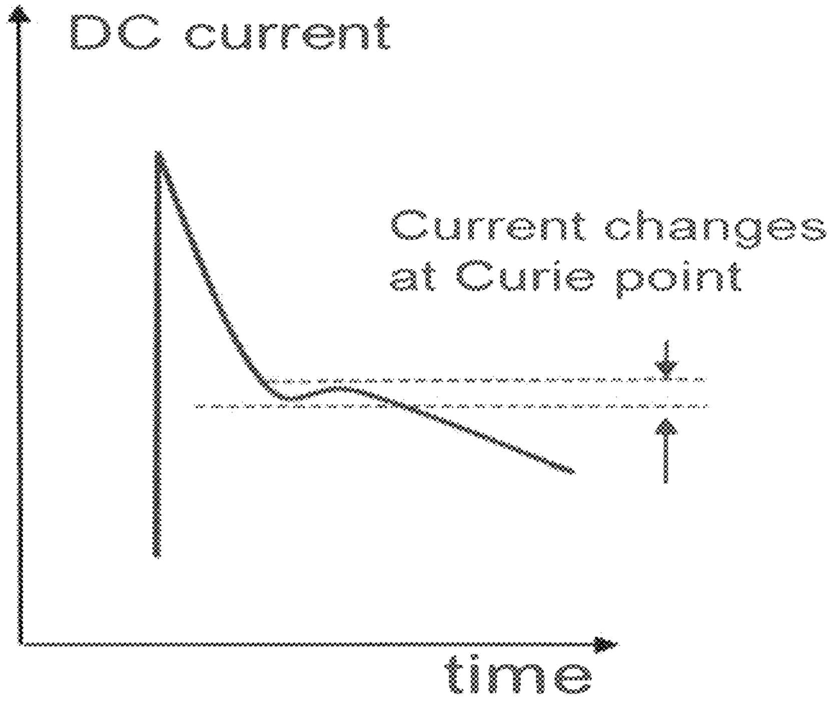
FIG. 7 is a graph of DC current vs. time illustrating the remotely detectable current changes that occur when a susceptor material undergoes a phase transition associated with its Curie point.

As the susceptor 4 of an aerosol-generating article 10 is heated during operation its apparent resistance (Ra) increases. This increase in resistance can be remotely detected by monitoring the DC current drawn from the DC power source 250, which at constant voltage decreases as the temperature of the susceptor increases. The high frequency alternating magnetic field provided by the inductor 210 induces eddy currents in close proximity to the susceptor surface, an effect that is known as the skin effect. The resistance in the susceptor depends in part on the electrical resistivities of the first and second susceptor materials and in part on the depth of the skin layer in each material available for induced eddy currents. As the second susceptor material 6 (Nickel) reaches its Curie temperature it loses its magnetic properties. This causes an increase in the skin layer available for eddy currents in the second susceptor material, which causes a decrease in the apparent resistance of the susceptor. The result is a temporary increase in the detected DC current when the second susceptor material reaches its Curie point. This can be seen in the graph of FIG. 7.

By remote detection of the change in resistance in the susceptor, the moment at which the susceptor 4 reaches the second Curie temperature can be determined. At this point the susceptor is at a known temperature (354° C. in the case of a Nickel susceptor). At this point the electronics in the device operate to vary the power supplied and thereby reduce or stop the heating of the susceptor. The temperature of the susceptor then decreases to below the Curie temperature of the second susceptor material. The power supply may be increased again, or resumed, either after a period of time or after it has been detected that the second susceptor material has cooled below its Curie temperature. By use of such a feedback loop the temperature of the susceptor may be maintain to be approximately that of the second Curie temperature.

The specific embodiment described in relation to FIG. 3 comprises an aerosol-forming substrate formed from homogenised tobacco. In other embodiments the aerosol-forming substrate may be formed from different material. For example, a second specific embodiment of an aerosol-generating article has elements that are identical to those described above in relation to the embodiment of FIG. 3, with the exception that the aerosol-forming substrate 20 is formed from a non-tobacco sheet of cigarette paper that has been soaked in a liquid formulation comprising nicotine pyruvate, glycerine, and water. The cigarette paper absorbs the liquid formulation and the non-tobacco sheet thus comprises nicotine pyruvate, glycerine and water. The ratio of glycerine to nicotine is 5:1. In use, the aerosol-forming substrate 20 is heated to a temperature of about 220 degrees Celsius. At this temperature an aerosol comprising nicotine pyruvate, glycerine, and water is evolved and may be drawn through the filter 50 and into the user's mouth. It is noted that the temperature that the substrate 20 is heated to is considerably lower than the temperature that would be required to evolve an aerosol from a tobacco substrate. As such it is preferred that the second susceptor material is a material having a lower Curie temperature than Nickel. An appropriate Nickel alloy may, for example, be selected.

The exemplary embodiments described above are not intended to limit the scope of the claims. Other embodiments consistent with the exemplary embodiments described above will be apparent to those skilled in the art.

The invention claimed is:

1. An aerosol-generating article, comprising:

a plurality of elements assembled within a wrapper in the form of a rod having a mouth end and a distal end upstream from the mouth end, the plurality of elements including:

an aerosol-forming substrate disposed at or towards the distal end of the rod; and a susceptor configured to heat the aerosol-forming substrate, wherein the susceptor comprises a first susceptor material and a second susceptor material being different from the first susceptor material, the second susceptor material being plated, deposited, or welded onto the first susceptor material, wherein the susceptor is an elongate susceptor having a length dimension that is greater than a width dimension thereof or than a thickness dimension thereof, the susceptor being disposed in a radially central position within the aerosol-forming substrate, and wherein the second susceptor material has a Curie temperature that is lower than 500° C.

2. The aerosol-generating article according to claim 1, wherein the length dimension of the susceptor is greater than twice the width dimension thereof or than the thickness dimension thereof.

3. The aerosol-generating article according to claim 1, wherein the susceptor has a length of between 5 mm and 15 mm.

4. The aerosol-generating article according to claim 1, wherein the susceptor has a width of between 3 mm and 6 mm and a thickness of between 10 μm and 200 μm.

5. The aerosol-generating article according to claim 1, wherein the susceptor extends along a longitudinal axis of the aerosol-forming substrate.

6. The aerosol-generating article according to claim 1, wherein the susceptor is in direct contact with the aerosol-forming substrate.

7. The aerosol-generating article according to claim 1, wherein the susceptor is in the form of a pin, a rod, or a blade comprising the first susceptor material and the second susceptor material.

8. The aerosol-generating article according to claim 1, wherein the susceptor is rectangular.

9. The aerosol-generating article according to claim 1, wherein the first susceptor material is configured to heat the aerosol-forming substrate and the second susceptor material is configured to determine when the susceptor reaches a temperature corresponding to a second Curie temperature of the second susceptor material.

10. The aerosol-generating article according to claim 9, wherein, upon reaching the second Curie temperature, the second susceptor material reversibly changes from a ferromagnetic phase to a paramagnetic phase thereby causing a change in an apparent resistance of the susceptor.

11. The aerosol-generating article according to claim 1, wherein the susceptor comprises the first susceptor material having a first Curie temperature and the second susceptor material having a second Curie temperature that is lower than 500° C., the second Curie temperature being lower than the first Curie temperature.

12. The aerosol-generating article according to claim 1, wherein the first susceptor material is in the form of an elongate strip having a width of between 3 mm and 6 mm and a thickness of between 10 μm and 200 μm, the second susceptor material being in the form of discrete patches that are plated, deposited, or welded onto the first susceptor material.

13. The aerosol-generating article according to claim 1, wherein the first susceptor material and the second susceptor material are co-laminated in the form of an elongate strip having a width of between 3 mm and 6 mm and a thickness of between 10 μm and 200 μm, the first susceptor material having a greater thickness than the second susceptor material.

14. The aerosol-generating article according to claim 1, wherein the elongate susceptor has a width of between 3 mm and 6 mm and a thickness of between 10 μm and 200 μm, the susceptor comprising a core of the first susceptor material encapsulated by the second susceptor material.

15. The aerosol-generating article according to claim 1, comprising more than one susceptor.

16. An aerosol-generating system comprising an electrically-operated aerosol-generating device having an inductor configured to produce a fluctuating or alternating electromagnetic field and an aerosol-generating article according to claim 1, the aerosol-generating article engaging with the aerosol-generating device such that the fluctuating or alternating magnetic field produced by the inductor induces a current in the susceptor causing the susceptor to heat up, wherein the electrically-operated aerosol-generating device comprises electronic circuitry configured to detect a Curie transition of the second susceptor material.

* * * * *